United States Patent
Chen et al.

(10) Patent No.: US 11,979,613 B2
(45) Date of Patent: *May 7, 2024

(54) METHODS AND APPARATUSES OF SYNTAX SIGNALING CONSTRAINT FOR CROSS-COMPONENT ADAPTIVE LOOP FILTER IN VIDEO CODING SYSTEM

(71) Applicant: HFI Innovation Inc., Zhubei (TW)

(72) Inventors: Ching-Yeh Chen, Hsinchu (TW);
Olena Chubach, San Jose, CA (US);
Chen-Yen Lai, Hsinchu (TW);
Tzu-Der Chuang, Hsinchu (TW);
Chih-Wei Hsu, Hsinchu (TW);
Yu-Wen Huang, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 11 days.

This patent is subject to a terminal disclaimer.

(21) Appl. No.: 17/851,268

(22) Filed: Jun. 28, 2022

(65) Prior Publication Data

US 2022/0329874 A1    Oct. 13, 2022

Related U.S. Application Data

(63) Continuation of application No. 17/110,491, filed on Dec. 3, 2020, now Pat. No. 11,432,016.

(Continued)

(51) Int. Cl.
*H04N 19/00*   (2014.01)
*H04N 19/117*  (2014.01)
(Continued)

(52) U.S. Cl.
CPC .......... *H04N 19/82* (2014.11); *H04N 19/117* (2014.11); *H04N 19/172* (2014.11);
(Continued)

(58) Field of Classification Search
CPC .... H04N 19/117; H04N 19/174; H04N 19/82; H04N 19/70; H04N 19/46; H04N 19/172; H04N 19/186; H04N 19/176
See application file for complete search history.

(56) References Cited

U.S. PATENT DOCUMENTS

| | | |
|---|---|---|
| 10,045,038 B2 | 8/2018 | Liu et al. |
| 10,057,574 B2 | 8/2018 | Li et al. |

(Continued)

FOREIGN PATENT DOCUMENTS

| | | |
|---|---|---|
| CN | 107211154 A | 9/2017 |
| CN | 107615763 A | 1/2018 |

(Continued)

OTHER PUBLICATIONS

International Search Report and Written Opinion dated Mar. 4, 2021, issued in application No. PCT/CN2020/133995.

(Continued)

*Primary Examiner* — Zhihan Zhou
(74) *Attorney, Agent, or Firm* — McClure, Qualey & Rodack, LLP (57) ABSTRACT

Encoding methods and apparatuses include receiving input video data of a current block in a current picture and applying a Cross-Component Adaptive Loop Filter (CCALF) processing on the current block based on cross-component filter coefficients to refine chroma components of the current block according to luma sample values. The method further includes signaling two Adaptive Loop Filter (ALF) signal flags and two CCALF signal flags in an Adaptation Parameter Set (APS) with an APS parameter type equal to ALF or parsing two ALF signal flags and two CCALF signal flags from an APS with an APS parameter type equal to ALF, signaling or parsing one or more Picture Header (PH) CCALF syntax elements or Slice Header (SH) CCALF syntax elements, wherein both ALF and CCALF (Continued)

signaling are present either in a PH or SH, and encoding or decoding the current block in the current picture.

6 Claims, 5 Drawing Sheets

Related U.S. Application Data (60) Provisional application No. 62/959,707, filed on Jan. 10, 2020, provisional application No. 62/943,836, filed on Dec. 5, 2019.

(51) Int. Cl.
*H04N 19/172* (2014.01)
*H04N 19/174* (2014.01)
*H04N 19/176* (2014.01)
*H04N 19/186* (2014.01)
*H04N 19/46* (2014.01)
*H04N 19/70* (2014.01)
*H04N 19/82* (2014.01)

(52) U.S. Cl.
CPC ......... *H04N 19/174* (2014.11); *H04N 19/176* (2014.11); *H04N 19/186* (2014.11); *H04N 19/46* (2014.11); *H04N 19/70* (2014.11)

(56) References Cited

U.S. PATENT DOCUMENTS

| | | | |
|---|---|---|---|
| 10,419,757 B2 | 9/2019 | Chen et al. | |
| 10,440,396 B2 | 10/2019 | Zhang et al. | |
| 10,855,985 B2 | 12/2020 | Zhang et al. | |
| 2014/0301463 A1 | 10/2014 | Rusanovskyy et al. | |
| 2018/0160116 A1 | 6/2018 | Kim et al. | |
| 2019/0320172 A1 | 10/2019 | Zhang et al. | |
| 2020/0344473 A1* | 10/2020 | Seregin | H04N 19/70 |
| 2020/0389655 A1* | 12/2020 | Seregin | H04N 19/30 |
| 2021/0067793 A1* | 3/2021 | Hu | H04N 19/13 |
| 2021/0084318 A1* | 3/2021 | Kuo | H04N 19/159 |
| 2021/0084340 A1* | 3/2021 | Li | H04N 19/46 |
| 2021/0092370 A1* | 3/2021 | Hu | H04N 19/176 |

FOREIGN PATENT DOCUMENTS

| | | |
|---|---|---|
| CN | 109691102 A | 4/2019 |
| CN | 110024401 A | 7/2019 |
| CN | 110463202 A | 11/2019 |
| WO | 2018/183533 A1 | 10/2018 |

OTHER PUBLICATIONS

Misra, K., et al.; "Cross-Component Adaptive Loop Filter for chroma;" Joint Video Experts Team (JVET) of ITU-T SG 16 WP 3 and ISO/IEC JTC 1/SC 29/WG 11; Jul. 2019; pp. 1-9.
Chinese language office action dated Apr. 15, 2023, issued in application No. CN 202080080824.8.
Chinese language Notice of Allowance dated Aug. 30, 2023, issued in application No. CN 202080080824.8.
Duan, J.; "Research on Fast Algorithm for Depth Video Coding in 3D-HEVC;" May 2018; pp. 1-70.
English language translation of abstract of "Research on Fast Algorithm for Depth Video Coding in 3D-HEVC" (pp. 5-6 of publication).
Guo, J., et al.; "A fast AVS2 screen mixed content intra-coding algorithm;" Aug. 2017; pp. 1-2.
English language translation of abstract of "A fast AVS2 screen mixed content intra-coding algorithm".
Zhang, K., et al.; "Enhanced Cross-Component Linear Model for Chroma Intra-Prediction in Video Coding;" IEEE Transactions on Image Processing; vol. 27; No. 8; Aug. 2018; pp. 3983-3997.

* cited by examiner

METHODS AND APPARATUSES OF SYNTAX SIGNALING CONSTRAINT FOR CROSS-COMPONENT ADAPTIVE LOOP FILTER IN VIDEO CODING SYSTEM

CROSS REFERENCE TO RELATED APPLICATIONS

The present invention is a Continuation of U.S. patent application Ser. No. 17/110,491, filed on Dec. 3, 2020, which claims priority to U.S. Provisional Patent Application Ser. No. 62/943,836, filed on Dec. 5, 2019, entitled "Cross-Component Adaptive loop filter signaling constraints", and U.S. Provisional Patent Application Ser. No. 62/959,707, filed on Jan. 10, 2020, entitled "Method of sequence-level on-off of CCALF". The U.S. Provisional Patent Applications are hereby incorporated by reference in their entireties.

FIELD OF THE INVENTION

The present invention relates to video data processing methods and apparatuses for video encoding or video decoding. In particular, the present invention relates to syntax signaling constraints for cross-component adaptive loop filter in a video encoding or decoding system.

BACKGROUND AND RELATED ART

The High-Efficiency Video Coding (HEVC) standard is the latest video coding standard developed by the Joint Collaborative Team on Video Coding (JCT-VC) group of video coding experts from ITU-T Study Group. The HEVC standard relies on a block-based coding structure which divides each slice into multiple Coding Tree Units (CTUs). A coded picture is represented by one or a collection of slices, each slice includes an integer number of CTUs. The individual CTUs in a slice are processed according to a raster scanning order. Sample values of each block in a Bi-predictive (B) slice are decoded using intra picture prediction or inter picture prediction using at most two motion vectors and reference indices. Sample values of each block in a Predictive (P) slice is decoded using intra picture prediction or inter picture prediction using only one motion vector and reference index. An Intra (I) slice is decoded using intra picture prediction only. Each CTU is further recursively divided into one or more Coding Units (CUs) according to a quadtree partitioning method to adapt to various local motion and texture characteristics.

The prediction decision is made at the CU level, where each CU is either coded by inter picture prediction or intra picture prediction. Once the splitting of CU hierarchical tree is done, each CU is subject to further split into one or more Prediction Units (PUs) according to a PU partition type for prediction. The PU, together with the associated CU syntax, works as a basic representative block for sharing the prediction information as the same prediction process is applied to all pixels in the PU and prediction relevant information is conveying to the decoder on a PU basis. A specified prediction process is employed to predict the values of associated pixel samples inside the PU. After obtaining a residual signal generated by the prediction process, residual data of the residual signal belong to a CU is split into one or more Transform Units (TUs) according to a Residual QuadTree (RQT) block partitioning structure for transforming the residual data into transform coefficients for compact data representation. The TU is a basic representative block for applying transform and quantization on the residual signal in the encoding process. For each TU, a transform matrix having the same size as the TU is applied to the residual signal to generate the transform coefficients, and these transform coefficients are quantized and conveyed to the decoder on a TU basis.

The terms Coding Tree Block (CTB), Coding block (CB), Prediction Block (PB), and Transform Block (TB) are defined to specify two-dimensional sample array of one colour component associated with the CTU, CU, PU, and TU respectively. For example, a CTU consists of one luminance (luma, Y) CTB, two chrominance (chroma, Cb and Cr) CTBs, and its associated syntax elements. In the HEVC standard, the same quadtree block partitioning structure is generally applied to both luma and chroma components unless a minimum size for chroma block is reached.

Figure 1:
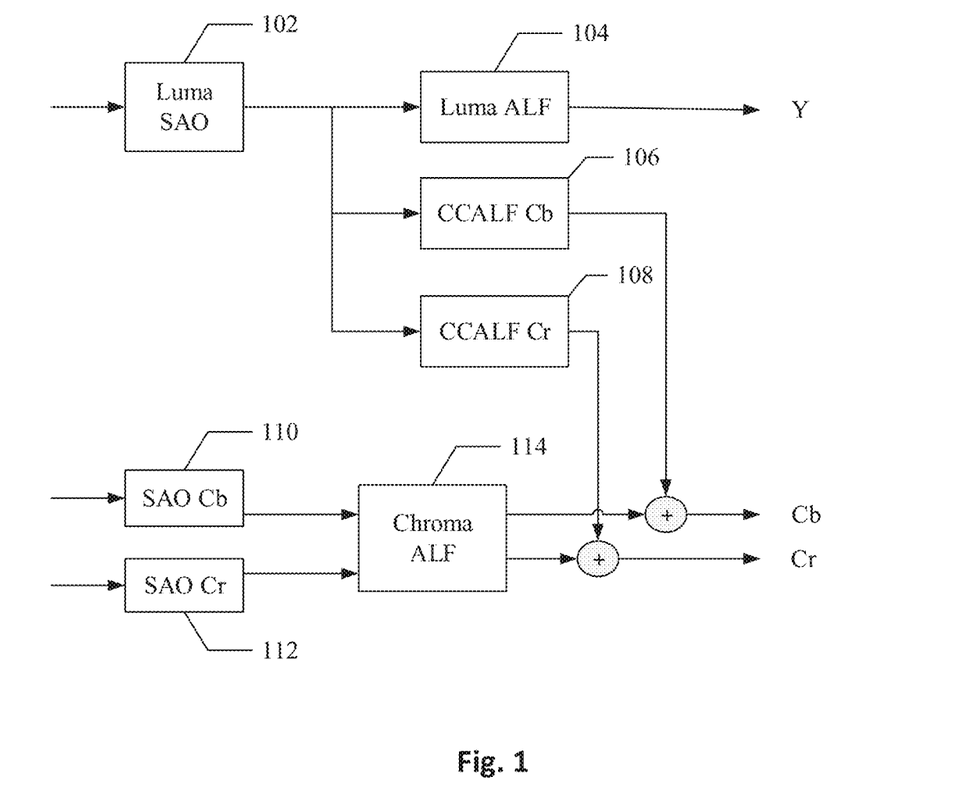
FIG. 1 illustrates an exemplary block diagram of in loop filter processing in a video encoding or decoding system.

Joint Video Expert Team (WET) of ITU-T and ISO/IEC are currently in the process of establishing the next-generation video coding standard Versatile Video Coding (VVC). A Cross-Component Adaptive Loop Filter (CCALF) is proposed to improve the coding efficiency by refining ALF filtered chroma sample values of each chroma component according to luma sample values. The CCALF is based on the concept of extracting details from the luma component that are lost in the chroma components inside the coding loop. The CCALF operates in parallel with the existing luma ALF operation. FIG. 1 illustrates the placement of CCALF with respect to the other loop filters. Luma samples processed by a luma Sample Adaptive Offset (SAO) 102 are the input of a luma ALF 104, a CCALF for the Cb component 106, and a CCALF for the Cr component 108. The filtered luma samples Y generated by the luma ALF 104 are stored in a reference picture buffer. Chroma Cb samples are first processed by a Cb SAO 110 then by a chroma ALF 114, similarly, chroma Cr samples are first processed by a Cr SAO 112 then by the chroma ALF 114. The CCALF for the Cb component 106 outputs correction values for the filtered chroma Cb samples and the CCALF for the Cr component 108 outputs correction values for the filtered chroma Cr samples. The correction values for Cb combined with the filtered chroma Cb samples are stored in the reference picture buffer, and the correction values for Cr combined with the filtered chroma Cr samples are also stored in the reference picture buffer.

Figure 2:
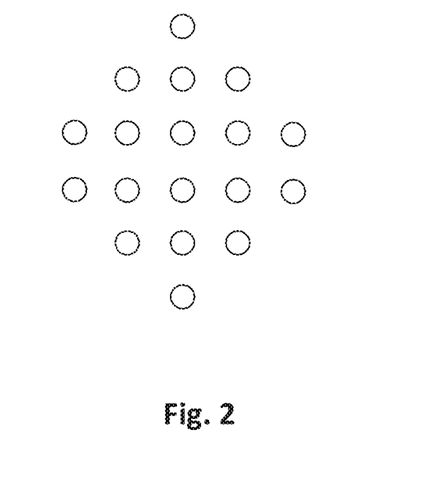
FIG. 2 illustrates an exemplary diamond shaped filter used in CCALF.

The CCALF applies a linear diamond shaped filter as shown in FIG. 2 to the luma channel for each chroma component. Filter coefficients of the linear diamond shaped filter are transmitted in an Adaptation Parameter Set (APS), scaled by a factor of $2^{10}$, and rounded for fixed point representation. The filter coefficient dynamic range is limited to 6-bit signed value. Filter selection is performed at the CTU level with support for up to four filters. In order to better harmonize with the ALF design, symmetric line selection is used at a virtual boundary and temporal layer coefficient buffers are not used. Each residual output is clipped from $-2^{BitDepthC-1}$ to $2^{BitDepthC-1}-1$, inclusively. Data carried in each APS can be shared across and referenced by multiple pictures or slices. Each APS has a unique identifier (ID) and is used to identify which APS is referenced by a current picture or a current slice when an APS ID is included in a Picture Header (PH) of the current picture or a Slice Header (SH) of the current slice. The application of the filters is controlled on a variable block size and signaled by a context-coded flag received for each block of samples. The CCALF is enabled or disabled on a block basis. The block size along with a CCALF enabling flag is received at a slice level for each chroma component. The block sizes supported for chroma components are 16×16, 32×32, 64×64, and 128×128.

In VTM4, each APS contains one set of Adaptive Loop Filter (ALF) coefficients, and up to 32 APSs can be used during video encoding or decoding. A tile group or a slice can re-use the ALF information from an APS to reduce the overhead. The 32 APSs are updated as a first-in-first-out (FIFO) buffer. In a CTB based ALF scheme, when an ALF processing is applied to a luma CTB, the choice among 5 temporal or 1 signaled ALF filter sets is selected by the video encoder and indicated by signaling a filter set index in the encoded bitstream. The filter set index is signaled for indicating the selected ALF filter set. For each slice, only one new set of 25 ALF filters can be signaled. If a new set of ALF filters is signaled for a current slice, all luma CTBs in the current slice share this new set of ALF filters. When an ALF processing is applied to a chroma CTB, if a new ALF filter set is signaled for a current slice, the chroma CTB uses the new ALF filter set; otherwise, a most recent temporal chroma filter satisfying the temporal scalability constraint is applied. As for the slice-level temporal filter, the APSs are updated as a FIFO buffer and the FIFO indices are used to identify the reference of a temporal filter.

BRIEF SUMMARY OF THE INVENTION

Methods of processing video data in a video encoding or decoding system receive input video data associated with a current block in a current picture, apply a CCALF processing on the current block based on CCALF coefficients to refine one or more chroma components Cb and Cr of the current block according to a luma component of the current block, signal two ALF signal flags and two CCALF signal flags in an APS with an APS parameter type equal to ALF or parse two ALF signal flags and two CCALF signal flags in an APS with an APS parameter type equal to ALF, and encode or decode the current block in the current picture. An APS with an APS parameter type equal to ALF is also called an ALF APS. The CCALF coefficients are signaled in the ALF APS. The two ALF signal flags specify whether ALF coefficients for the luma and chroma components are signaled in the ALF APS respectively and the two CCALF signal flags specify whether CCALF coefficients for the chroma components Cb and Cr are signaled in the ALF APS respectively. Values of the two ALF signal flags and the two CCALF signal flags in each ALF APS are not all equal to 0.

In one embodiment, each of the two CCALF signal flags is inferred to be equal to 0 when the CCALF signal flag is not present in the ALF APS. For each ALF APS, CCALF coefficients are signaled in the ALF APS for at least one of the chroma components Cb and Cr when ALF coefficients are not signaled in the ALF APS for the luma and chroma components.

In one specific embodiment, the values of the two ALF signal flags in each ALF APS are not all equal to 0, and at the same time, the values of the two CCALF signal flags in each ALF APS are not all equal to 0.

Some embodiments of the present invention allow different slices within the current picture to reference different ALF APSs for obtaining CCALF coefficients. For example, different slices within the current picture are capable of referencing up to 8 ALF APSs for obtaining CCALF coefficients. In some embodiments of the present invention, a maximum number of different ALF APSs available for referencing for CCALF coefficients by slices in the current picture is the same as a maximum number of different ALF APSs available for referencing for ALF coefficients by the slices in the current picture.

In some embodiments, the video data processing method further comprises signaling or parsing one or more Picture Header (PH) CCALF syntax elements or Slice Header (SH) CCALF syntax elements as both ALF and CCALF signaling are present either in a PH or SH. CCALF signaling is conditioned on a picture level ALF enabling flag or a slice level ALF enabling flag according to one embodiment. In another embodiment, CCALF signaling is conditioned on both a Sequence Parameter Set (SPS) level ALF enabling flag and a picture level ALF enabling flag.

The video data processing method further comprises signaling or parsing a SPS ALF enabling flag, and then conditionally signaling or parsing a separate SPS CCALF enabling flag according to the SPS ALF enabling flag according to one embodiment. The SPS ALF enabling flag specifies whether the ALF processing is enabled or disabled and the SPS CCALF enabling flag specifies whether the CCALF processing is enabled or disabled. The SPS CCALF enabling flag is signaled or parsed when the SPS ALF enabling flag indicates the ALF processing is enabled, in other words, the CCALF processing can only be enabled when the ALF processing is enabled. In one embodiment, a separate general constraint flag for the CCALF processing is signaled in or parsed from a general constraint information syntax table. The SPS CCALF enabling flag is equal to 0 when the separate general constraint flag for the CCALF processing is equal to 1. The separate general constraint flag for the CCALF processing is equal to 1 if a general constraint flag for the ALF processing is equal to 1 implying the CCALF processing must be disabled when the ALF processing is disabled. The video encoding or decoding system applies the ALF processing on the current block based on ALF coefficients when the SPS ALF enabling flag specifies the ALF processing is enabled.

Aspects of the disclosure further provide an apparatus for the video encoding or decoding system processing video data by receiving input video data of a current block in a current picture, applying a CCALF processing on the current block based on CCALF coefficients to refine one or more chroma components Cb and Cr of the current block according to a luma component of the current block, signaling two ALF signal flags and two CCALF signal flags in an ALF APS or parsing two ALF signal flags and two CCALF signal flags from an ALF APS, and encoding or decoding the current block in the current picture. The CCALF coefficients are signaled in an ALF APS. The two ALF signal flags of an ALF APS specify whether ALF coefficients for the luma and chroma components are signaled in the ALF APS, and the two CCALF signal flags of an ALF APS specify whether CCALF coefficients for the chroma components Cb and Cr are signaled in the ALF APS. Values of the two ALF signal flags and the two CCALF signal flags in each ALF APS are constrained to not all equal to 0. Other aspects and features of the invention will become apparent to those with ordinary skill in the art upon review of the following descriptions of specific embodiments.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF THE INVENTION

It will be readily understood that the functional modules of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

According to VTM-5.0 of the VVC standard, each Adaptation Parameter Set (APS) is classified into one of three categories according to an APS parameter type of the APS. The three APS parameter types in VTM-5.0 are Adaptive Loop Filter (ALF) type, Luma Mapping Chroma Scaling (LMCS) type, and reserved type. The APS parameter type of a current APS specifies the type of parameters carried in the current APS, that is, ALF coefficients are signaled in the current APS when the APS parameter type is ALF type and similarly, LMCS coefficients are signaled in the current APS when the APS parameter type is LMCS type.

Constraint Values of CCALF Flags In the current design of ALF, there are two ALF signal flags alf_luma_filter_signal_flag and alf_chroma_filter_signal_flag signaled in an APS with the APS parameter type equal to the ALF type, which specify whether luma and chroma filters are signaled in this APS respectively. For example, there are luma filter coefficients signaled in the APS when the value of the ALF signal flag alf_luma_filter_signal_flag is equal to 1, and there are chroma filter coefficients signaled in the APS when the value of the ALF signal flag alf_chroma_filter_signal_flag is equal to 1. There is a limitation on the values of these two ALF signal flags to avoid signaling an empty APS without any filter coefficient. For each ALF APS, the values of the two ALF signal flags alf_luma_filter_signal_flag and alf_chroma_filter_signal_flag shall not both be equal to 0. In the current design of CCALF, there are two CCALF signal flags, alf_cross_component_cb_filter_signal_flag and alf_cross_component_cr_filter_signal_flag, signaled in an APS with the APS parameter type equal to the ALF type, which specify whether cross-component Cb and Cr filter coefficients are signaled in the APS respectively. In the current CCALF design, there is no limitation on the values of these two CCALF signal flags signaled in each ALF APS. It means that it is not possible to signal ALF APS without ALF luma filters and without ALF chroma filters but with CCALF coefficients signaled for at least one Cb or Cr color component. This case, however, can appear, e.g. when predefined ALF filters are used for filtering, meaning that no signaling is needed for ALF, while it is still applied. And CCALF is applied to one or more chroma components. Some embodiments of the present invention set a limitation on the values of the two ALF signal flags and the two CCALF signal flags such that each APS with an APS parameter type equal to ALF is not completely empty. In one embodiment, the values of the two ALF signal flags alf_luma_filter_signal_flag and alf_chroma_filter_signal_flag, and the two CCALF signal flags alf_cross_component_cb_filter_signal_flag and alf_cross_component_cr_filter_signal_flag shall not all be equal to 0. In other words, at least one of the two ALF signal flags and the two CCALF signal flags must be equal to 1. The syntax element alf_cross_component_cb_filter_signal_flag, also referred to as alf_cc_cb_filter_signal_flag, specifies whether cross-component filter coefficients for the Cb colour component are signaled. For example, cross-component filter coefficients for the Cb colour component are signaled in the APS when the syntax element alf_cc_cb_filter_signal_flag is equal to 1, while the cross-component filter coefficients for the Cb colour component are not signaled when alf_cc_cb_filter_signal_flag is equal to 0. The value of alf_cc_cb_filter_signal_flag is inferred to be equal to 0 if it is not present in the APS. The syntax element alf_cross_component_cr_filter_signal_flag, also referred to as alf_cc_cr_filter_signal_flag, specifies whether the cross-component filter coefficients for the Cr colour component are signaled. For example, the cross-component filter coefficients for the Cr colour component are signaled in the APS when the syntax element alf_cc_cr_filter_signal_flag is equal to 1, while the cross-component filter coefficients for the Cr colour component are not signaled when alf_cc_cr_filter_signal_flag is equal to 0. The value of alf_cc_cr_filter_signal_flag is inferred to be equal to 0 when it is not present in the APS. In one embodiment of the present invention, in cases when ALF filter coefficients are not signaled for both the luma and chroma components in a current APS, CCALF filter coefficients are signaled in the current APS for at least one of the Cb and Cr colour components. Various embodiment of the present invention ensures each ALF APS to carry filter coefficients for at least one of luma ALF filters, chroma ALF filters, cross-component filters for Cb, and cross-component filters for Cr, so that when the APS is an ALF APS, it would not be completely empty.

A video encoder implementing the above embodiment of the present invention sets at least one of the two ALF signal flags and the two CCALF signal flags in each ALF APS to be equal to 1 and signals the two ALF signal flags and two CCALF signal flags in each ALF APS to ensure there are filter coefficients signaled in each ALF APS. A video decoder implementing the above embodiment of the present invention parses the two ALF signal flags and the two CCALF signal flags from each referenced ALF APS, and values of the two ALF signal flags and the two CCALF signal flags in each referenced ALF APS are not all equal to 0.

In another embodiment, the limitation is imposed separately on ALF and CCALF filter coefficients. For example, the values of the ALF signal flags alf_luma_filter_signal_flag and alf_chroma_filter_signal_flag shall not both be equal to 0, and at the same time, the values of the two CCALF signal flags alf_cross_component_cb_filter_signal_flag and alf_cross_component_cr_filter_signal_flag shall not both be equal to 0.

Constraint on the Number of ALF APSs Referenced by Slices of One Picture In the current version of the CCALF design, there is a constraint to restrict different slices in one picture can only reference one ALF APS. A requirement of bitstream conformance restricts the APS ID of the ALF APS referred by all slices of a current picture must be the same when the CCALF enabling flag signaled at the slice level indicates the CCALF is enabled. However, in the current version of the ALF design, slices of a current picture may reference up to 8 ALF APSs. That is, the syntax element adaptation_parameter_set_id provides an identifier for the APS for referencing by other syntax elements, and the value of adaptation_parameter_set_id is within the range of 0 to 7 inclusively when the APS type aps_params_type is equal to ALF or SCALING. An APS Network Abstraction Layer (NAL) unit with a particular value of adaptation_parameter_set_id and a particular value of aps_params_type can be shared across pictures, and different slices within a picture can reference different ALF APSs. In one embodiment, the CCALF design is aligned with the ALF design so the limitation of referencing only one ALF APS for the CCALF is removed. Different slices within a picture can reference more than one ALF APS for obtaining CCALF coefficients when the CCALF is enabled according to this embodiment. In one embodiment, the maximum number of different ALF APSs available for referencing for CCALF coefficients is the same as the maximum number of different ALF APSs available for referencing for ALF coefficients. For example, the maximum number of ALF APSs referenced by different slices of one picture for both the ALF and CCALF is equal to 8. In an alternative embodiment, the ALF design is aligned with the current CCALF design, so that all slices of a current picture can only reference to one ALF APS for obtaining ALF coefficients.

On Conditioning of CCALF In the current version of the ALF design, ALF is enabled at the Sequence Parameter Set (SPS) level by a SPS ALF enabling flag sps_alf_enabled_flag, and ALF parameters such as an ALF enabling flag and ALF APS IDs can be signaled in either the picture level or slice level if the SPS ALF enabling flag is equal to 1. The ALF parameters may be signaled in Picture Header (PH) or Slice Header (SH). However, the current version of the CCALF design is only enabled at the slice level by signaling slice level enabling flags slice_cross_component_alf_cb_enabled_flag and slice_cross_component_alf_cr_enabled_flag. These two slice level enabling flags are signaled when the SPS ALF enabling flag indicates ALF is enabled in the sequence level as follows.

| | Descriptor |
|---|---|
| slice_header( ) { | |
| ... | |
| if( sps_alf_enabled_flag ) { | |
| ... | |
|   if( ChromaArrayType != 0 ) | |
|     slice_cross_component_alf_cb_enabled_flag | u(1) |
|   if( slice_cross_component_alf_cb_enabled_flag ) { | |
|     slice_cross_component_alf_cb_aps_id | u(3) |
|   } | |
|   if( ChromaArrayType != 0 ) | |
|     slice_cross_component_alf_cr_enabled_flag | u(1) |
|   if( slice_cross_component_alf_cr_enabled_flag ) { | |
|     slice_cross_component_alf_cr_aps_id | u(3) |
|   } | |
| } | |

In one embodiment of the present invention, the CCALF design is aligned with the ALF design, so that both ALF and CCALF signaling are possible either in the Picture Header (PH) or Slice Header (SH) as shown in the following. The control for the CCALF is the same as for the ALF as both ALF and CCALF syntax elements are either signaled at the PH or at the SH.

| | Descriptor |
|---|---|
| picture_header_rbsp( ) { | |
| ... | |
| if( sps_alf_enabled_flag ) 1 | |
|   pic_alf_enabled_present_flag | u(1) |
|   if( pic_alf_enabled_present_flag ) { | |
|     pic_alf_enabled_flag | u(1) |
|     if( pic_alf_enabled_flag ) { | |
|       pic_num_alf_aps_ids_luma | u(3) |
|       for( i = 0; i < pic_num_alf_aps_ids_luma; i++) | |
|         pic_alf_aps_id_luma[ i ] | u(3) |
|       if( ChromaArrayType != 0) | |
|         pic_alf_chroma_idc | u(2) |
|       if( pic_alf_chroma_idc ) | |
|         pic_alf_aps_id_chroma | u(3) |
|     } | |
|     if (ChromaArrayType != 0) { | |
|       pic_cross_component_alf_cb_enabled_flag | u(1) |
|       pic_cross_component_alf_cr_enabled_flag | u(1) |
|     } | |
|     if( pic_cross_component_alf_cb_enabled_flag ) | |
|       pic_cross_component_alf_cb_aps_id | u(3) |
|     if( pic_cross_component_alf_cr_enabled_flag ) | |
|       pic_cross_component_alf_cr_aps_id | u(3) |
|   } | |
| } | |

| | Descriptor |
|---|---|
| slice_header( ) { | |
| ... | |
| if( sps_alf_enabled_flag && !pic_alf_enabled_present_flag ) { | |
|   slice_alf_enabled_flag | u(1) |
|   if( slice_alf_enabled_flag ) { | |
|     slice_num_alf_aps_ids_luma | u(3) |
|     for( i = 0; i < slice_num_alf_aps_ids_luma; i++) | |
|       slice_alf_aps_id_luma[ i ] | u(3) |
|     if( ChromaArrayType != 0 ) | |
|       slice_alf_chroma_idc | u(2) |
|     if( slice_alf_chroma_idc ) | |
|       slice_alf_aps_id_chroma | u(3) |
|   } | |

-continued

| | Descriptor |
|---|---|
|     if( ChromaArrayType != 0 ) { | |
|         slice_cross_component_alf_cb_enabled_flag | u(1) |
|         slice_cross_component_alf_cr_enabled_flag | u(1) |
|     } | |
|     if( slice_cross_component_alf_cb_enabled_flag ) | |
|         slice_cross_component_alf_cb_aps_id | u(3) |
|     if( slice_cross_component_alf_cr_enabled_flag ) | |
|         slice_cross_component_alf_cr_aps_id | u(3) |
| } | |

In another embodiment, the CCALF design is aligned to the ALF design, and both ALF and CCALF signaling are present either in the PH or SH as follows. CCALF signaling is conditioned on a picture level ALF enabling flag pic_alf_enabled_flag signaled in the PH or a slice level ALF enabling flag slice_alf_enabled_flag in a SH.

| | Descriptor |
|---|---|
| picture_header_rbsp( ) { | |
| ... | |
|   if( sps_alf_enabled_flag ) { | |
|     pic_alf_enabled_present_flag | u(1) |
|     if( pic_alf_enabled_present_flag ) { | |
|       pic_alf_enabled_flag | u(1) |
|       if( pic_alf_enabled_flag ) { | |
|         pic_num_alf_aps_ids_luma | u(3) |
|         for( i = 0; i < pic_num_alf_aps_ids_luma; i++) | |
|           pic_alf_aps_id_luma[ i ] | u(3) |
|         if( ChromaArrayType != 0 ) | |
|           pic_alf_chroma_idc | u(2) |
|         if( pic_alf_chroma_idc ) | |
|           pic_alf_aps_id_chroma | u(3) |
|         if ( ChromaArrayType != 0 ) { | |
|           pic_cross_component_alf_cb_enabled_flag | u(1) |
|           pic_cross_component_alf_cr_enabled_flag | u(1) |
|         } | |
|         if( pic_cross_component_alf_cb_enabled_flag ) | |
|           pic_cross_component_alf_cb_aps_id | u(3) |
|         if( pic_cross_component_alf_cr_enabled_flag ) | |
|           pic_cross_component_alf_cr_aps_id | u(3) |
|       } | |
|     } | |
|   } | |

| | Descriptor |
|---|---|
| slice_header( ) { | |
| ... | |
|   if( sps_alf_enabled_flag &&  !pic_alf_enabled_present_flag ) { | |
|     slice_alf_enabled_flag | u(1) |
|     if( slice_alf_enabled_flag ) { | |
|       slice_num_alf_aps_ids_luma | u(3) |
|       for( i = 0; i < slice_num_alf_aps_ids_luma; i++ ) | |
|         slice_alf_aps_id_luma[ i ] | u(3) |
|       if( ChromaArrayType != 0 ) | |
|         slice_alf_chroma_idc | u(2) |
|       if( slice_alf_chroma_idc ) | |
|         slice_alf_aps_id_chroma | u(3) |
|       if( ChromaArrayType != 0 ) { | |
|         slice_cross_component_alf_cb_enabled_flag | u(1) |
|         slice_cross_component_alf_cr_enabled_flag | u(1) |
|       } | |
|       if( slice_cross_component_alf_cb_enabled_flag ) | |
|         slice_cross_component_alf_cb_aps_id | u(3) |
|       if( slice_cross_component_alf_cr_enabled_flag ) | |
|         slice_cross_component_alf_cr_aps_id | u(3) |
|     } | |
|   } | |

In yet another embodiment, the CCALF design is aligned with the ALF design and syntax elements related to CCALF are signaled in a PH or SH only if both the SPS level enabling flag and the picture level enabling flag indicate the ALF is enabled and ALF related syntax elements are present in the PH or SH. Some examples of the syntax elements related to the CCALF signaled in the PH are pic_cross_component_alf_enabled_present_flag, pic_cross_component_alf_cb_enabled_flag, pic_cross_component_alf_cr_enabled_flag, pic_cross_component_alf_cb_aps_id, and pic_cross_component_alf_cr_aps_id. Some examples of the syntax elements related to the CCALF signaled in the SH are slice_cross_component_alf_cb_enabled_flag, slice_cross_component_alf_cr_enabled_flag, slice_cross_component_alf_cb_aps_id, and slice_cross_component_alf_cr_aps_id.

| | Descriptor |
|---|---|
| picture_header_rbsp( ) { | |
| ... | |
|   if( sps_alf_enabled_flag ) { | |
|     pic_alf_enabled_present_flag | u(1) |
|     pic_cross_component_alf_enabled_present_flag | u(1) |
|     if( pic_alf_enabled_present_flag ) { | |
|       pic_alf_enabled_flag | u(1) |
|       if( pic_alf_enabled_flag ) { | |
|         pic_num_alf_aps_ids_luma | u(3) |
|         for( i = 0; i < pic_num_alf_aps_ids_luma; i++ ) | |
|           pic_alf_aps_id_luma[ i ] | u(3) |
|         if( ChromaArrayType != 0 ) | |
|           pic_alf_chroma_idc | u(2) |
|         if( pic_alf_chroma_idc ) | |
|           pic_alf_aps_id_chroma | u(3) |
|         if (pic_cross_component_alf_enabled_present_flag && ChromaArrayType != 0) { | |
|           pic_cross_component_alf_cb_enabled_flag | u(1) |
|           pic_cross_component_alf_cr_enabled_flag | u(1) |
|         } | |
|         if( pic_cross_component_alf_cb_enabled_flag ) | |
|           pic_cross_component_alf_cb_aps_id | u(3) |
|         if( pic_cross_component_alf_cr_enabled_flag ) | |
|           pic_cross_component_alf_cr_aps_id | u(3) |
|       } | |
|     } | |
|   ... | |
|   } | |

| | Descriptor |
|---|---|
| slice_header( ) { | |
| ... | |
|   if( sps_alf_enabled_flag && !pic_alf_enabled_present_flag ) { | |
|     slice_alf_enabled_flag | u(1) |
|     if( slice_alf_enabled_flag ) { | |
|       slice_num_alf_aps_ids_luma | u(3) |
|       for( i = 0; i < slice_num_alf_aps_ids_luma; i++ ) | |
|         slice_alf_aps_id_luma[ i ] | u(3) |

-continued

| | Descriptor |
|---|---|
| if( ChromaArrayType != 0 ) | |
|   slice_alf_chroma_idc | u(2) |
| if( slice_alf_chroma_idc ) | |
|   slice_alf_aps_id_chroma | u(3) |
| if( !pic_cross_component_alf_enabled_present_flag &&ChromaArrayType != 0 ) { | |
|   slice_cross_component_alf_cb_enabled_flag | u(1) |
|   slice_cross_component_alf_cr_enabled_flag | u(1) |
| } | |
| if( slice_cross_component_alf_cb_enabled_flag ) | |
|   slice_cross_component_alf_cb_aps_id | u(3) |
| if( slice_cross_component_alf_cr_enabled_flag ) | |
|   slice_cross_component_alf_cr_aps_id | u(3) |
|   } | |
| } | |
| ... | |
| } | |

In the following embodiment, CCALF syntax elements are signaled in the PH or SH depending on the chroma ALF when both the SPS level enabling flag and the picture level enabling flag indicate the ALF is enabled.

| | Descriptor |
|---|---|
| picture_header_rbsp( ) { | |
| ... | |
|   if( sps_alf_enabled_flag ) { | |
|     pic_alf_enabled_present_flag | u(1) |
|     if( pic_alf_enabled_present_flag ) { | |
|       pic_alf_enabled_flag | u(1) |
|       if( pic_alf_enabled_flag ) { | |
|         pic_num_alf_aps_ids_luma | u(3) |
|         for( i = 0; i < pic_num_alf_aps_ids_luma; i++ ) | |
|           pic_alf_aps_id_luma[ i ] | u(3) |
|         if( ChromaArrayType != 0 ) | |
|           pic_alf_chroma_idc | u(2) |
|         if( pic_alf_chroma_idc ) | |
|           pic_alf_aps_id_chroma | u(3) |
|         if( (pic_alf_chroma_idc ==1 \|\| pic_alf_chroma_idc ==3) && ChromaArrayType != 0 ) | |
|           pic_cross_component_alf_cb_enabled_flag | u(1) |
|         if ( (pic_alf_chroma_idc ==2 \|\| pic_alf_chroma_idc ==3) && ChromaArrayType != 0 ) | |
|           pic_cross_component_alf_cr_enabled_flag | u(1) |
|         if( pic_cross_component_alf_cb_enabled_flag ) | |
|           pic_cross_component_alf_cb_aps_id | u(3) |
|         if( pic_cross_component_alf_cr_enabled_flag ) | |
|           pic_cross_component_alf_cr_aps_id | u(3) |
|       } | |
|     } | |
|   } | |

| | Descriptor |
|---|---|
| slice_header( ) { | |
| ... | |
|   if( sps_alf_enabled_flag && !pic_alf_enabled_present_flag ) { | |
|     slice_alf_enabled_flag | u(1) |
|     if( slice_alf_enabled_flag ) { | |
|       slice_num_alf_aps_ids_luma | u(3) |
|       for( i = 0; i < slice_num_alf_aps_ids_luma; i++ ) | |
|         slice_alf_aps_id_luma[ i ] | u(3) |
|       if( ChromaArrayType != 0 ) | |
|         slice_alf_chroma_idc | u(2) |
|       if( slice_alf_chroma_idc ) | |
|         slice_alf_aps_id_chroma | u(3) |

-continued

| | Descriptor |
|---|---|
|       if( ( slice_alf_chroma_idc ==1 \|\| slice_alf_chroma_idc ==3) && ChromaArrayType != 0 ) | |
|         slice_cross_component_alf_cb_enabled_flag | u(1) |
|       if( ( slice_alf_chroma_idc ==2 \|\| slice_alf_chroma_idc ==3) && ChromaArrayType != 0 ) | |
|         slice_cross_component_alf_cr_enabled_flag | u(1) |
|       if( slice_cross_component_alf_cb_enabled_flag ) | |
|         slice_cross_component_alf_cb_aps_id | u(3) |
|       if( slice_cross_component_alf_cr_enabled_flag ) | |
|         slice_cross_component_alf_cr_aps_id | u(3) |
|     } | |
|   } | |

In one embodiment, CCALF syntax elements are signaled depending on chroma ALF and a picture level CCALF enable present flag.

| | Descriptor |
|---|---|
| picture_header_rbsp( ) { | |
| ... | |
|   if( sps_alf_enabled_flag ) { | |
|     pic_alf_enabled_present_flag | u(1) |
|     pic_cross_component_alf_enabled_present_flag | u(1) |
|     if( pic_alf_enabled_present_flag ) { | |
|       pic_alf_enabled_flag | u(1) |
|       if( pic_alf_enabled_flag ) { | |
|         pic_num_alf_aps_ids_luma | u(3) |
|         for( i = 0; i < pic_num_alf_aps_ids_luma; i++ ) | |
|           pic_alf_aps_id_luma[ i ] | u(3) |
|         if( ChromaArrayType != 0 ) | |
|           pic_alf_chroma_idc | u(2) |
|         if( pic_alf_chroma_idc ) | |
|           pic_alf_aps_id_chroma | u(3) |
|         if ( pic_cross_component_alf_enabled_present_flag){ | |
|           if ( (pic_alf_chroma_idc ==1 \|\| pic_alf_chroma_idc ==3) && ChromaArrayType != 0 ) | |
|             pic_cross_component_alf_cb_enabled_flag | u(1) |
|           if ( (pic_alf_chroma_idc ==2 \|\| pic_alf_chroma_idc ==3) && ChromaArrayType != 0 ) | |
|             pic_cross_component_alf_cr_enabled_flag | u(1) |
|         } | |
|         if( pic_cross_component_alf_cb_enabled_flag ) | |
|           pic_cross_component_alf_cb_aps_id | u(3) |
|         if( pic_cross_component_alf_cr_enabled_flag ) | |
|           pic_cross_component_alf cr aps_id | u(3) |
|       } | |
|     } | |
|   } | |
| } | |

| | Descriptor |
|---|---|
| slice_header( ) { | |
| ... | |
|   if( sps_alf_enabled_flag && !pic_alf_enabled_present_flag ) { | |
|     slice_alf_enabled_flag | u(1) |
|     if( slice_alf_enabled_flag ) { | |
|       slice_num_alf_aps_ids_luma | u(3) |
|       for( i = 0; i < slice_num_alf_aps_ids_luma; i++ ) | |
|         slice_alf_aps_id_luma[ i ] | u(3) |
|       if( ChromaArrayType != 0 ) | |
|         slice_alf_chroma_idc | u(2) |
|       if( slice_alf_chroma_idc ) | |
|         slice_alf_aps_id_chroma | u(3) |

| | Descriptor |
|---|---|
| if( !pic_cross_component_alf_enabled_present_flag){ | |
|   if ( ( slice_alf_chroma_idc ==1 \|\| slice_alf_chroma_idc ==3) && ChromaArrayType != 0 ) | |
|     slice_cross_component_alf_cb_enabled_flag | u(1) |
|   if( ( slice_alf_chroma_idc ==2 \|\| slice_alf_chroma_idc ==3) && ChromaArrayType != 0 ) | |
|     slice_cross_component_alf_cr_enabled_flag | u(1) |
|   } | |
|   if( slice_cross_component_alf_cb_enabled_flag ) | |
|     slice_cross_component_alf_cb_aps_id | u(3) |
|   if( slice_cross_component_alf_cr_enabled_flag ) | |
|     slice_cross_component_alf_cr_aps_id | u(3) |
|   } | |
| } | |

In the following embodiment, CCALF syntax elements are signaled only if the SPS level enabling flag and the picture level enabling flag indicate ALF is enabled, with possibility of overwriting at the PH.

| | Descriptor |
|---|---|
| picture_header_rbsp( ) { | |
| ... | |
|   if( sps_alf_enabled_flag ) { | |
|     pic_alf_enabled_present_flag | u(1) |
|     pic_cross_component_alf_enabled_present_flag | u(1) |
|     if (pic_cross_component_alf_enabled_present_flag) | |
|       pic_cross_component_alf_override_enabled_flag | u(1) |
|     if( pic_alf_enabled_present_flag ) { | |
|       pic_alf_enabled_flag | u(1) |
|       if( pic_alf_enabled_flag ) { | |
|         pic_num_alf_aps_ids_luma | u(3) |
|         for( i = 0; i < pic_num_alf_aps_ids_luma; i++ ) | |
|           pic_alf_aps_id_luma[ i ] | u(3) |
|         if( ChromaArrayType != 0 ) | |
|           pic_alf_chroma_idc | u(2) |
|         if( pic_alf_chroma_idc ) | |
|           pic_alf_aps_id_chroma | u(3) |
|       if ( pic_cross_component_alf_enabled_present_flag) { | |
|         if ( (pic_alf_chroma_idc == 1 \|\| pic_alf_chroma_idc ==3) && ChromaArrayType != 0 ) | |
|           pic_cross_component_alf_cb_enabled_flag | u(1) |
|         if ( (pic_alf_chroma_idc ==2 \|\| pic_alf_chroma_idc ==3) && ChromaArrayType != 0 ) | |
|           pic_cross_component_alf_cr_enabled_flag | u(1) |
|         } | |
|         if( pic_cross_component_alf_cb_enabled_flag ) | |
|           pic_cross_component_alf_cb_aps_id | u(3) |
|         if( pic_cross_component_alf_cr_enabled_flag ) | |
|           pic_cross_component_alf_cr_aps_id | u(3) |
|       } | |
|     } | |
|   } | |
| } | |

| | Descriptor |
|---|---|
| slice_header( ) { | |
| ... | |
|   if( sps_alf_enabled_flag && !pic_alf_enabled_present_flag ) { | |
|     slice_alf_enabled_flag | u(1) |
|     if( slice_alf_enabled_flag ) { | |
|       slice_num_alf_aps_ids_luma | u(3) |
|       for( i = 0; i < slice_num_alf_aps_ids_luma; i++ ) | |
|         slice_alf_aps_id_luma[ i ] | u(3) |
|       if( ChromaArrayType != 0 ) | |
|         slice_alf_chroma_idc | u(2) |
|       if( slice_alf_chroma_idc ) | |
|         slice_alf_aps_id_chroma | u(3) |
|       if (pic_cross_component_alf_override_enabled_flag) { | |
|         if( ( slice_alf_chroma_idc ==1 \|\| slice_alf_chroma_idc ==3) && ChromaArrayType != 0 ) | |
|           slice_cross_component_alf_cb_enabled_flag | u(1) |
|         if( ( slice_alf_chroma_idc ==2 \|\| slice_alf_chroma_idc ==3) && ChromaArrayType != 0 ) | |
|           slice_cross_component_alf_cr_enabled_flag | u(1) |
|       } | |
|       if( slice_cross_component_alf_cb_enabled_flag ) | |
|         slice_cross_component_alf_cb_aps_id | u(3) |
|       if( slice_cross_component_alf_cr_enabled_flag ) | |
|         slice_cross_component_alf_cr_aps_id | u(3) |
|     } | |
|   } | |

In one embodiment, overwriting is possible to be performed separately for Cb and Cr components. For example, CCALF parameters for both Cb and Cr components are signaled at a PH but only the CCALF parameters for the Cr component are overwritten at the slice level.

Separate Control for CCALF and ALF in Sequence Level

In some embodiments, there is a SPS level control for the CCALF, separately from the SPS level control for the ALF. The SPS level control for the CCALF is depending on the SPS level control for the ALF according to these embodiments. The SPS level control for the CCALF is realized by signaling or parsing a SPS level CCALF enabling flag, where the SPS level CCALF enabling flag is used for controlling CCALF signaling. An embodiment of signaling a separate SPS level CCALF enabling flag depending on a SPS level ALF enabling flag sps_alf_enabled_flag is demonstrated in the following, where the syntax element sps_cross_component_alf_enabled_flag specifies whether the cross-component adaptive loop filter is enabled or disabled for the current sequence.

| | Descriptor |
|---|---|
| seq_parameter_set_rbsp( ) { | |
| ... | |
|   sps_alf_enabled_flag | u(1) |
|   if (sps_alf_enabled_flag) | |
|     sps_cross_component_alf_enabled_flag | u(1) |
| ... | |

| | Descriptor |
|---|---|
| picture_header_rbsp( ) { | |
| ... | |
|   if( sps_alf_enabled_flag ) { | |
|     pic_alf_enabled_present_flag | u(1) |
| ... | |
|   if (sps_cross_component_alf_enabled_flag) | |
|     pic_cross_component_alf_enabled_present_flag | u(1) |
| ... | |
| } | |

| | Descriptor |
|---|---|
| slice_header( ) { | |
| ... | |
|   if( sps_alf_enabled_flag && | |
| !pic_alf_enabled_present_flag ) { | |
|     slice_alf_enabled_flag | u(1) |
|     if ( slice_alf_enabled_flag ) { | |
|     ... | |
|     if( sps_cross_component_alf_enabled_flag && | |
| !pic_cross_component_alf_enabled_present_flag && | |
| ChromaArrayType != 0 ) { | |
|       slice_cross_component_alf_cb_enabled_flag | u(1) |
|       slice_cross_component_alf_cr_enabled_flag | u(1) |
|     } | |
|   ... | |
| } | |

In one embodiment of signaling a SPS enabling flag for the CCALF, related syntax elements and semantics are demonstrated as follows.

| | Descriptor |
|---|---|
| seq_parameter_set_rbsp ( ) { | |
| ... | |
|   sps_sao_enabled_flag | u(1) |
|   sps_alf_enabled_flag | u(1) |
|   if (sps_alf_enabled_flag) | |
|     sps_ccalf_enabled_flag | u(1) |
|   sps_transform_skip_enabled_flag | u(1) |
|   if( sps_transform_skip_enabled_flag ) | |
|     sps_bdpcm_enabled_flag | u(1) |
|   if( sps_bdpcm_enabled_flag && chroma_format_idc == 3 ) | |
|     sps_bdpcm_chroma_enabled_flag | u(1) |
|   sps_ref_wraparound_enabled_flag | u(1) |
|   if( sps_ref_wraparound_enabled_flag ) | |
|     sps_ref_wraparound_offset_minus1 | ue(v) |
|   ... | |
|   if( picture_header_extension_present_flag ) { | |
|     ph_extension_length | ue(v) |
|     for( i = 0; i < ph_extension_length; i++) | |
|       ph_extension_data_byte[ i ] | u(8) |
|   } | |
|   rbsp_trailing_bits( ) | |
| } | |

The syntax element sps_ccalf_enabled_flag signaled in the SPS specifies whether the cross-component adaptive loop filter is enabled or disabled. The cross-component adaptive loop filter is disabled when sps_ccalf_enabled_flag is equal to 0 and the cross-component adaptive loop filter is enabled when sps_ccalf_enabled_flag is equal to 1. This syntax element sps_ccalf_enabled_flag is inferred to be 0 if it is not present in the SPS.

| | Descriptor |
|---|---|
| picture_header_rbsp( ) { | |
| ... | |
| if( sps_alf_enabled_flag ) { | |
|   pic_alf_enabled_present_flag | u(1) |
|   if( pic_alf_enabled_present_flag ) { | |
|     pic_alf_enabled_flag | u(1) |
|     if( pic_alf_enabled_flag ) { | |
|       pic_num_alf_aps_ids_luma | u(3) |
|       for( i = 0; i < pic_num_alf_aps_ids_luma; i++ ) | |
|         pic_alf_aps_id_luma[ i ] | u(3) |
|       if( ChromaArrayType != 0 ) | |
|         pic_alf_chroma_idc | u(2) |
|       if( pic_alf_chroma_idc ) | |
|         pic_alf_aps_id_chroma | u(3) |
|       if (sps_ccalf_enabled_flag && ChromaArrayType!= 0) { | |
|         pic_cross_component_alf_cb_enabled_flag | u(1) |
|         if( pic_cross_component_alf_cb_enabled_flag ) { | |
|           pic_cross_component_alf_cb_aps_id | u(3) |
|         } | |
|         pic_cross_component_alf_cr_enabled_flag | u(1) |
|         if( pic_cross_component_alf_cr_enabled_flag ) { | |
|           pic_cross_component_alf_cr_aps_id | u(3) |
|         } | |
|       } | |
|     } | |
|   } | |
| } | |
| ... | |

The syntax element pic_alf_enabled_flag signaled in the PH equals to 1 specifying the adaptive loop filter is enabled for all slices associated with the PH and may be applied to Y, Cb, or Cr colour component in the slices. The adaptive loop filter may be disabled for one, or more, or all slices associated with the PH when pic_alf_enabled_flag is equal to 0. The syntax elements pic_cross_component_alf_cb_enabled_flag, pic_cross_component_alf_cb_aps_id, pic_cross_component_cb_filters_signalled_minus1, pic_cross_component_alf_cr_enabled_flag, pic_cross_component_alf_cr_aps_id, and pic_cross_component_cr_filters_signalled_minus1 are not present in the PH when the syntax element pic_alf_enabled_flag is equal to 0. This syntax element pic_alf_enabled_flag is inferred to be equal to 0 when it is not present in the PH. The syntax element pic_cross_component_alf_cb_enabled_flag indicates whether the cross-component Cb filter is enabled for all slices associated with the PH or disabled for one, or more, or all slices associated with the PH. The cross-component Cb filter may be applied to the Cb colour component in the slices when pic_cross_component_alf_cb_enabled_flag is equal to 1. This syntax element pic_cross_component_alf_cb_enabled_flag is inferred to be equal to 0 when it is not present in the PH. The syntax element pic_cross_component_alf_cb_aps_id specifies the Adaptation Parameter Set (APS) ID of the ALF APS that the Cb colour component of the slices associated with the PH refers to. The value of alf_cross_component_cb_filter_signal_flag of the APS NAL unit having an APS parameter type equal to ALF and adaptation_parameter_set_id equal to pic_cross_component_alf_cb_aps_id shall be equal to 1. The syntax element pic_cross_component_cb_filters_signalled_minus1 plus 1 specifies the number of cross-component Cb filters, and the value of this syntax element shall be in the range of 0 to 3. When pic_cross_component_alf_cb_enabled_flag is equal to 1, it is a requirement of bitstream conformance that pic_cross_component_cb_filters_signalled_minus1 shall be less than or equal to the value of alf_cross_component_cb_filters_signalled_minus1 in the referenced ALF APS referred to by pic_cross_component_alf_cb_aps_id. The semantics of the syntax elements pic_cross_component_alf_cr_enabled_flag, pic_cross_component_alf_cr_aps_id, and pic_cross_component_cr_filters_signalled_minus1 are similar to that of pic_cross_component_alf_cb_enabled_flag, pic_cross_component_alf_cb_aps_id, and pic_cross_component_cb_filters_signalled_minus1.

```
slice_header( ) {
  ...
  if( sps_alf_enabled_flag && !pic_alf_enabled_present_flag )
  {
    slice_alf_enabled_flag                                    u(1)
    if( slice_alf_enabled_flag ) {
      slice_num_alf_aps_ids_luma                              u(3)
      for( i = 0; i < slice_num_alf_aps_ids_luma; i++ )
        slice_alf_aps_id_luma[ i ]                            u(3)
      if( ChromaArrayType != 0 )
        slice_alf_chroma_idc                                  u(2)
      if( slice_alf_chroma_idc )
        slice_alf_aps_id_chroma                               u(3)
      if (sps_ccalf_enabled_flag && ChromaArrayType!= 0) {
        slice_cross_component_alf_cb_enabled_flag             u(1)
        if( slice_cross_component_alf_cb_enabled_flag ) {
```

In the slice header, a syntax element slice_alf_enabled_flag_equal to 1 specifies that adaptive loop filter is enabled and may be applied to Y, Cb, or Cr colour component in a slice. The syntax element slice_alf_enabled_flag_equal to 0 specifies that adaptive loop filter is disabled for all colour components in a slice and syntax elements slice_cross_component_alf_cb_enabled_flag, slice_cross_component_alf_cb_aps_id, slice_cross_component_cb_filters_signalled_minus1, slice_cross_component_alf_cr_enabled_flag, slice_cross_component_alf_cr_aps_id, and slice_cross_component_cr_filters_signalled_minus1 are not present in the slice header when slice_alf_enabled_flag is equal to 0. This syntax element slice_alf_enabled_flag is inferred to be the value of pic_alf_enabled_flag when this syntax element is not present in the SH. The syntax element slice_cross_component_alf_cb_enabled_flag indicates whether the cross-component Cb filter is applied to the Cb colour component. In one embodiment, this syntax element is inferred to be equal to the value of pic_cross_component_alf_cb_enabled_flag when this syntax element is not present in the SH. In another embodiment, this syntax element is inferred to be equal to the value of (!pic_cross_component_alf_cb_enabled_flag) when this syntax element is not present in the SH. The syntax element slice_cross_component_alf_cb_aps_id specifies the adaptation parameter set ID that the Cb colour component of the slice refers to. The TemporalId of the APS NAL unit having the APS parameter type equal to ALF and adaptation parameter set ID equal to slice_cross_component_alf_cb_aps_id shall be less than or equal to the TemporalId of the coded slice NAL unit. When slice_cross_component_alf_cb_enabled_flag is equal to 1 and slice_cross_component_alf_cb_aps_id is not present in the SH, the value of slice_cross_component_alf_cb_aps_id is inferred to be equal to the value of pic_cross_component_alf_cb_aps_id. The value of alf_cross_component_cb_filter_signal_flag of the APS NAL unit having the APS parameter type equal to ALF and adaptation parameter set ID equal to slice_cross_component_alf_cb_aps_id shall be equal to 1. The syntax element slice_cross_component_cb_filters_signalled_minus1 plus 1 specifies the number of cross-component Cb filters. The value of slice_cross_component_cb_filters_signalled_minus1 shall be in the range of 0 to 3. When slice_cross_component_alf_cb_enabled_flag is equal to 1 and slice_cross_component_cb_filters_signalled_minus1 is not present in the SH, the value of slice_cross_component_cb_filters_signalled_minus1 is inferred to be equal to the value of pic_cross_component_alf_cb_aps_id of the current slice. In another embodiment, when slice_cross_component_alf_cb_enabled_flag is equal to 1 and slice_cross_component_cb_filters_signalled_minus1 is not present in the SH, the value of slice_cross_component_cb_filters_signalled_minus1 is inferred to be equal to the value of pic_cross_component_cb_filters_signalled_minus1 of the current slice. The semantics of the syntax elements slice_cross_component_alf_cr_enabled_flag, slice_cross_component_alf_cr_aps_id, and slice_cross_component_cr_filters_signalled_minus1 are similar to that of the corresponding syntax elements slice_cross_component_alf_cb_enabled_flag, slice_cross_component_alf_cb_aps_id, and slice_cross_component_cb_filters_signalled_minus1.

Separate General Constraint Flag for CCALF In one embodiment of the CCALF design, a separate general constraint flag for the CCALF no_ccalf_constraint_flag is added to a general constraint information syntax table general_constraint_info( ). The SPS level CCALF enabling flag sps_ccalf_enabled_flag equals to 0 indicating the CCALF is disabled when this separate general constraint flag no_ccalf_constraint_flag is equal to 1. A syntax element no_ccalf_constraint_flag equals to 1 specifying that the SPS level CCALF enabling flag sps_ccalf_enabled_flag shall be equal to 0, and no_ccalf_constraint_flag equals to 0 indicating this constraint is not imposed. It is a requirement of the bitstream conformance that the value of the separate general constraint flag for the CCALF no_ccalf_constraint_flag shall be equal to 1 if the general constraint flag for the ALF no_alf_constraint_flag is equal to 1. An example of the general_constraint_info( ) syntax table is shown in the following.

| | |
|---|---|
| no_sao_constraint_flag | u(1) |
| no_alf_constraint_flag | u(1) |
| no_ccalf_constraint_flag | u(1) |
| no_joint_cbcr_constraint_flag | u(1) |

Adaptive Loop Filter Data Syntax in ALF APS An example of adaptive loop filter data syntax elements and cross-component ALF data syntax elements signaled in an ALF APS is shown in the following.

| | Descriptor |
|---|---|
| ```alf_data( ) {``` | |
| ```  alf_luma_filter_signal_flag``` | u(1) |
| ```  alf_chroma_filter_signal_flag``` | u(1) |
| ```  alf_cross_component_cb_filter_signal_flag``` | u(1) |
| ```  alf_cross_component_cr_filter_signal_flag``` | u(1) |
| ```  if( alf_luma_filter_signal_flag ) {``` | |
| ```    alf_luma_clip_flag``` | u(1) |
| ```    alf_luma_num_filters_signalled_minus1``` | ue(v) |
| ```    if( alf_luma_num_filters_signalled_minus1 > 0 ) {``` | |
| ```      for( filtIdx = 0; filtIdx < NumAlfFilters; filtIdx++ )``` | |
| ```        alf_luma_coeff_delta_idx[ filtIdx ]``` | u(v) |
| ```    }``` | |
| ```    for( sfIdx = 0; sfIdx <=``` | |
| ```alf_luma_num_filters_signalled_minus1; sfIdx++ ) {``` | |
| ```      for( j = 0; j < 12; j++ ) {``` | |
| ```        alf_luma_coeff_abs[ sfIdx ][ j ]``` | uek(v) |
| ```        if( alf_luma_coeff_abs[ sfIdx ][ j ] )``` | |
| ```          alf_luma_coeff_sign[ sfIdx ][ j ]``` | u(1) |
| ```      }``` | |
| ```    }``` | |
| ```    if( alf_luma_clip_flag ) {``` | |
| ```      for( sfIdx = 0; sfIdx <=``` | |
| ```alf_luma_num_filters_signalled_minus1; sfIdx++ ) {``` | |
| ```        for( j = 0; j < 12; j++ )``` | |
| ```          alf_luma_clip_idx[ sfIdx ][ j ]``` | u(2) |
| ```      }``` | |
| ```    }``` | |
| ```  }``` | |

-continued

| | Descriptor |
|---|---|
| if( alf_chroma_filter_signal_flag ) { | |
|   alf_chroma_num_alt_filters_minus1 | ue(v) |
|   for( altIdx = 0; altIdx <= alf_chroma_num_alt_filters_minus1; altIdx++ ) { | |
|     alf_chroma_clip_flag[ altIdx ] | u(1) |
|     for( j = 0; j < 6; j++ ) { | |
|       alf_chroma_coeff_abs[ altIdx ][ j ] | uek(v) |
|       if( alf_chroma_coeff_abs[ altIdx ][ j ] > 0 ) | |
|         alf_chroma_coeff_sign[ altIdx ][ j ] | u(1) |
|     } | |
|     if( alf_chroma_clip_flag[ altIdx ] ) { | |
|       for( j = 0; j < 6; j++ ) | |
|         alf_chroma_clip_idx[ altIdx ][ j ] | u(2) |
|     } | |
|   } | |
| } | |
| if ( alf_cross_component_cb_filter_signal_flag ) { | |
|   alf_cross_component_cb_filters_signalled_minus1 | ue(v) |
|   for( k = 0; k < (alf_cross_component_cb_filters_signalled_minus1+1); k++ ) | |
|   { | |
|     for ( j = 0; j < 8; j++ ) | |
|       alf_cross_component_cb_coeff_plus32[ k ][ j ] | u(6) |
|   } | |
| } | |
| if ( alf_cross_component_cr_filter_signal_flag ) { | |
|   alf_cross_component_cr_filters_signalled_minus1 | ue(v) |
|   for( k = 0; k < (alf_cross_component_cr_filters_signalled_minus1+1); k++ ) { | |
|     for ( j = 0; j < 8; j++ ) | |
|       alf_cross_component_cr_coeff_plus32[ k ][ j ] | u(6) |
|   } | |
| } | |
| } | |

The syntax element alf_cross_component_cb_filter_signal_flag equals to 1 specifying that a cross-component Cb filter is signaled, while alf_cross_component_cb_filter_signal_flag equals to 0 specifying that a cross-component Cb filter is not signaled. When ChromaArrayType is equal to 0, alf_cross_component_cb_filter_signal_flag shall also be equal to 0. It is a requirement of the bitstream conformance that the value of alf_cross_component_cb_filter_signal_flag shall be equal to 0 if alf_luma_filter_signal_flag is equal to 1. The syntax element alf_cross_component_cr_filter_signal_flag equals to 1 specifying that a cross-component Cr filter is signaled in this APS, and alf_cross_component_cr_filter_signal_flag equals to 0 specifying that a cross-component Cr filter is not signaled. Similarly, when ChromaArrayType is equal to 0, alf_cross_component_cr_filter_signal_flag shall be equal to 0. It is a requirement of the bitstream conformance that the value of alf_cross_component_cr_filter_signal_flag shall be equal to 0 if alf_luma_filter_signal_flag is equal to 1. Each ALF APS only carries luma ALF filter parameters or cross-component filter parameters. The syntax element alf_cross_component_cb_filters_signalled_minus1 plus 1 specifies the number of cross-component Cb filters signaled in the current ALF APS. The value of alf_cross_component_cb_filters_signalled_minus1 shall be in the range of 0 to 3. The syntax element alf_cross_component_cb_coeff_plus32[k][j] minus 32 specifies the value of the j-th coefficient of the signaled k-th cross-component Cb filter set. When this syntax is not present, it is inferred to be equal to 32. The signaled k-th cross-component Cb filter coefficients CcAlfApsCoeff$_{Cb}$[adaptation parameter set id] [k] with elements CcAlfApsCoeff$_{Cb}$[adaptation parameter set id][k][j], with j=0.7 are derived as follows:

CcAlfApsCoeff$_{Cb}$[ adaptation_parameter_set_id][ k][j]= alf_cross_component_cb_coeff_plus32[ k][j]−32

The syntax element alf_cross_component_cr_filters_signalled_minus1 plus 1 specifies the number of cross-component Cr filters signaled in the current ALF APS. The value of alf_cross_component_cr_filters_signalled_minus1 shall be in the range of 0 to 3. The syntax element alf_cross_compnent_cr_coeff_plus32[k][j] minus 32 specifies the value of the j-th coefficient of the signaled k-th cross-component Cr filter set. When alf_cross_component_cr_coeff_abs[k][j] is not present, it is inferred to be equal to 32. The signaled k-th cross-component Cr filter coefficients CcAlfApsCoeff$_{Cr}$[adaptation parameter set id][k] with elements CcAlfApsCoeff$_{Cr}$[adaptation parameter set id][k][j], with j=0.7 are derived as follows:

CcAlfApsCoeff$_{Cr}$[ adaptation_parameter_set_id][ k][j]= alf_cross_component_cr_coeff_plus32[ k][j]−32

Representative Flowcharts for Exemplary Video Encoding and Decoding System

Figure 3:
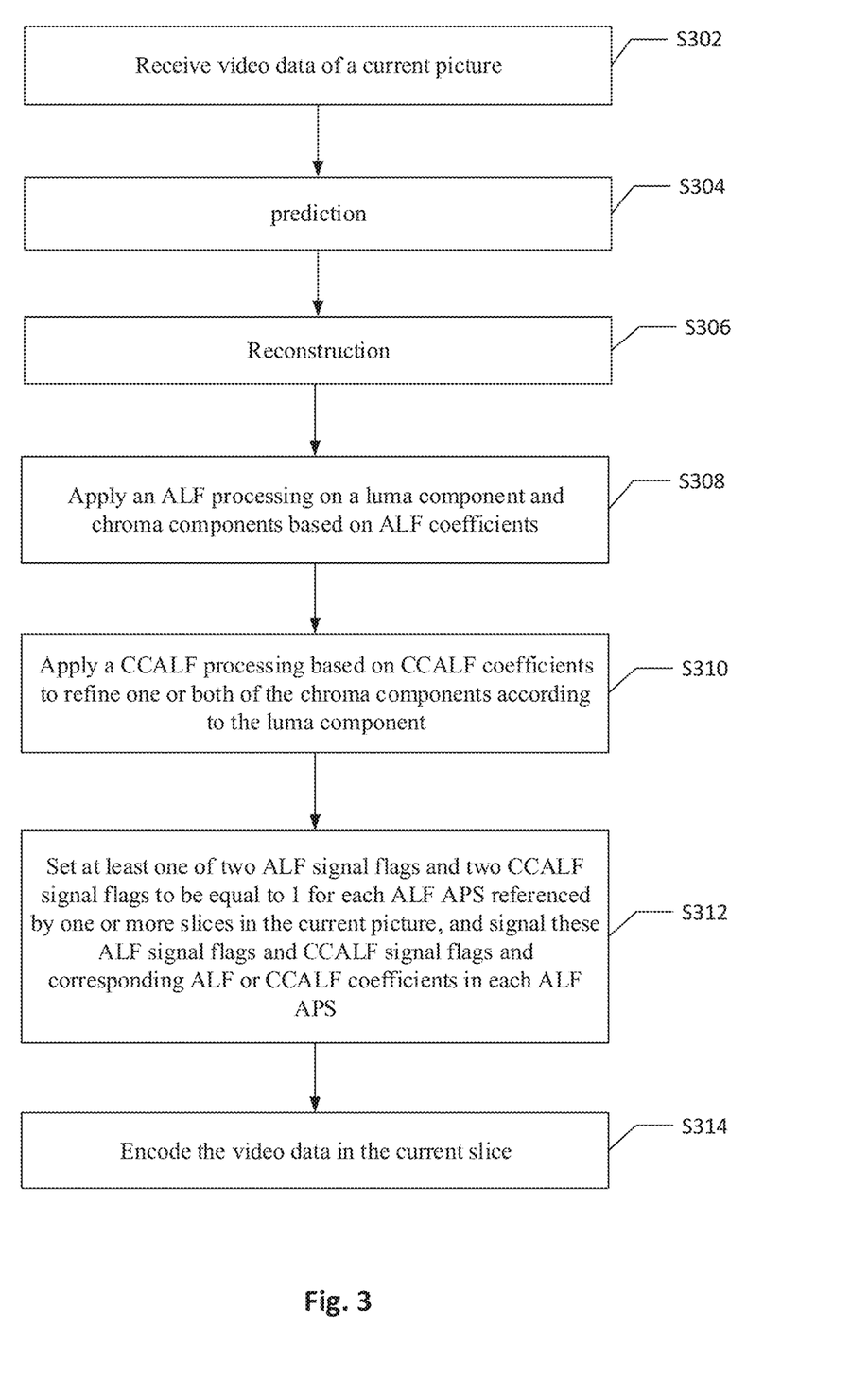
FIG. 3 is a flowchart illustrating an embodiment of the present invention for encoding video data of a current picture by applying ALF and CCALF based on ALF and CCALF coefficients signaled in one or more ALF APSs.

FIG. 3 is a flowchart illustrating an exemplary embodiment of the present invention for encoding a current picture by a video encoding system. Video data associated with a current picture is received by the video encoding system in step S302. FIG. 3 demonstrates an embodiment of filtering reconstructed data of the current picture with an ALF processing and a CCALF processing when both the ALF and CCALF are enabled. The video data is predicted by intra prediction or inter prediction in step S304 and then reconstructed in step S306. In step S308, the ALF processing is applied to the video data for filtering a luma component, chroma components, or both the luma and chroma components of the current picture based on ALF coefficients after prediction in step S304 and reconstruction in step S306. In step S310, the CCALF processing is applied based on CCALF coefficients to refine one or both of the chroma components according to the luma component. The ALF coefficients and the CCALF coefficients are signaled in APSs with an APS parameter type equals to ALF, which are also called ALF APSs. In step S312, the video encoding system ensures each ALF APS to carry at least one set of ALF or CCALF coefficients by setting at least one of alf_luma_filter_signal_flag, alf_chroma_filter_signal_flag, alf_cross_component_cb_filter_signal_flag, and alf_cross_component_cr_filter_signal_flag to be equal to 1 for each ALF APS. These two ALF signal flags alf_luma_filter_signal_flag and alf_chroma_filter_signal_flag and two CCALF signal flags alf_cross_component_cb_filter_signal_flag and alf_cross_component_cr_filter_signal_flag are signaled in each of the ALF APSs. The two ALF signal flags alf_luma_filter_signal_flag and alf_chroma_filter_signal_flag in an ALF APS indicate whether luma filter coefficients and chroma filter coefficients are signaled in this ALF APS respectively. The two CCALF signal flags alf_cross_component_cb_filter_signal_flag and alf_cross_component_cr_filter_signal_flag in an ALF APS indicate whether cross-component cb filter coefficients and cross-component cr filter coefficients are signaled in this ALF APS respectively. The video encoding system encodes the video data in the current picture in step S314.

Figure 4:
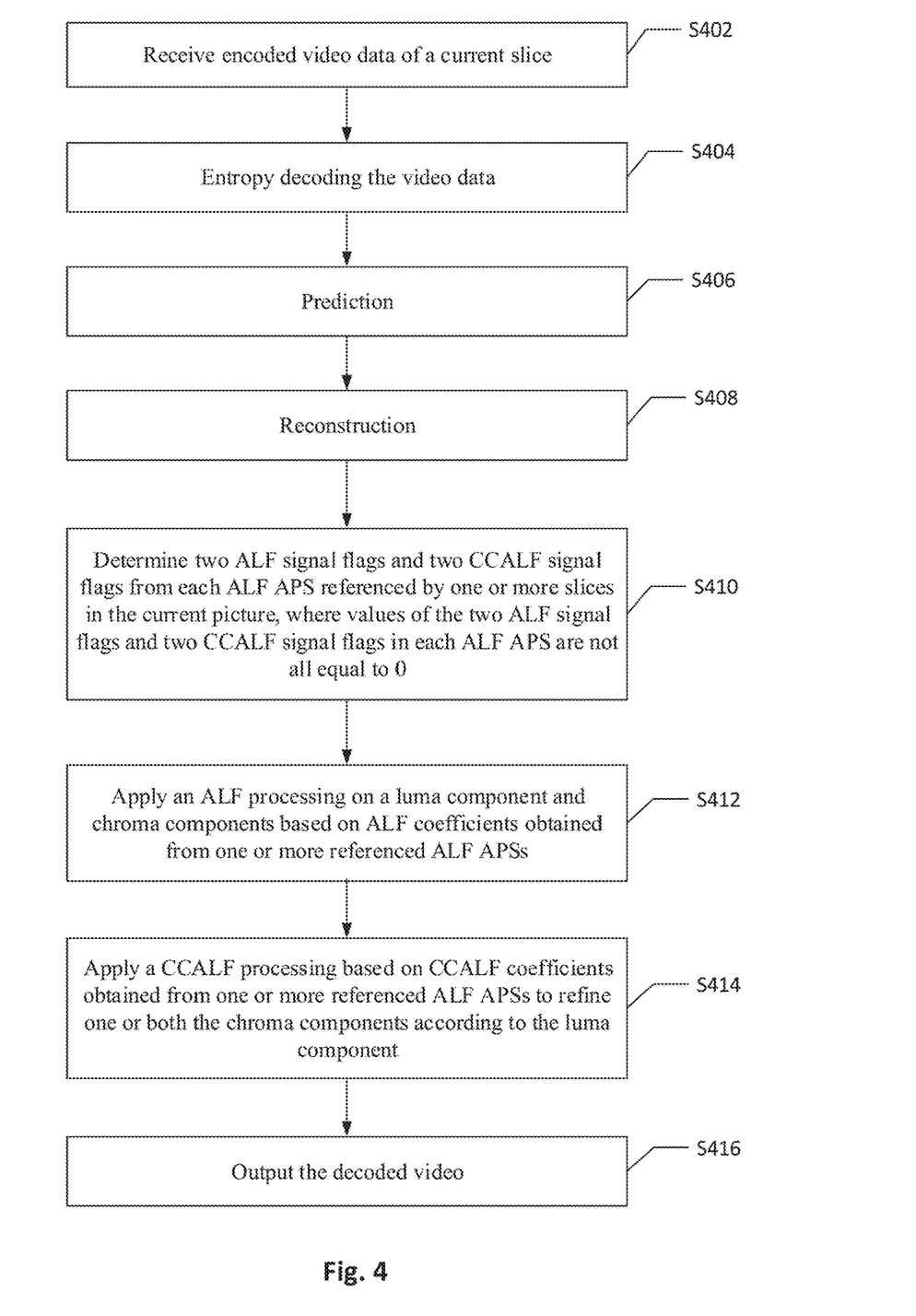
FIG. 4 is a flowchart illustrating an embodiment of the present invention for decoding video data of a current picture by applying ALF and CCALF based on ALF and CCALF coefficients signaled in one or more ALF APSs.

FIG. 4 is a flowchart illustrating an exemplary embodiment of the present invention for decoding video data of a current picture by a video decoding system. Encoded video data associated with a current picture is received by the video decoding system in step S402. FIG. 4 demonstrates an embodiment of filtering reconstructed data of the current picture with an ALF processing and a CCALF processing when both the ALF and CCALF processing are enabled. For example, both an SPS level ALF enabling flag and an SPS CCALF enabling flag parsed for a current sequence indicate the ALF and CCALF processing are enabled for the current sequence, and a picture level ALF enabling flag and a picture level CCAFL enabling flag parsed for the current picture indicate the ALF and CCALF processing are enabled for the current picture. The video decoding system performs entropy decoding on the video data in step S404, performs prediction in step S406, and performs reconstruction in step S408. In step S410, two ALF signal flags alf_luma_filter_signal_flag and alf_chroma_filter_signal_flag and two CCALF signal flags alf_cross_component_cb_filter_signal_flag and alf_cross_component_cr_filter_signal_flag are obtained from each ALF APS referenced by one or more slices in the current picture. It is a requirement of bitstream conformance that the values of the two ALF signal flags and two CCALF signal flags in each ALF APS are not all equal to 0 to ensure at least one set of ALF or CCALF coefficients are signaled in each ALF APS. The video decoding system applies an ALF processing on a luma component and chroma components based on ALF coefficients obtained from one or more referenced ALF APSs in step S412, and applies a CCALF processing based on CCALF coefficients obtained from one or more referenced ALF APSs to refine one or both the chroma components according to the luma component in step S414. The video decoding system outputs the decoded video in step S416.

Figure 5:
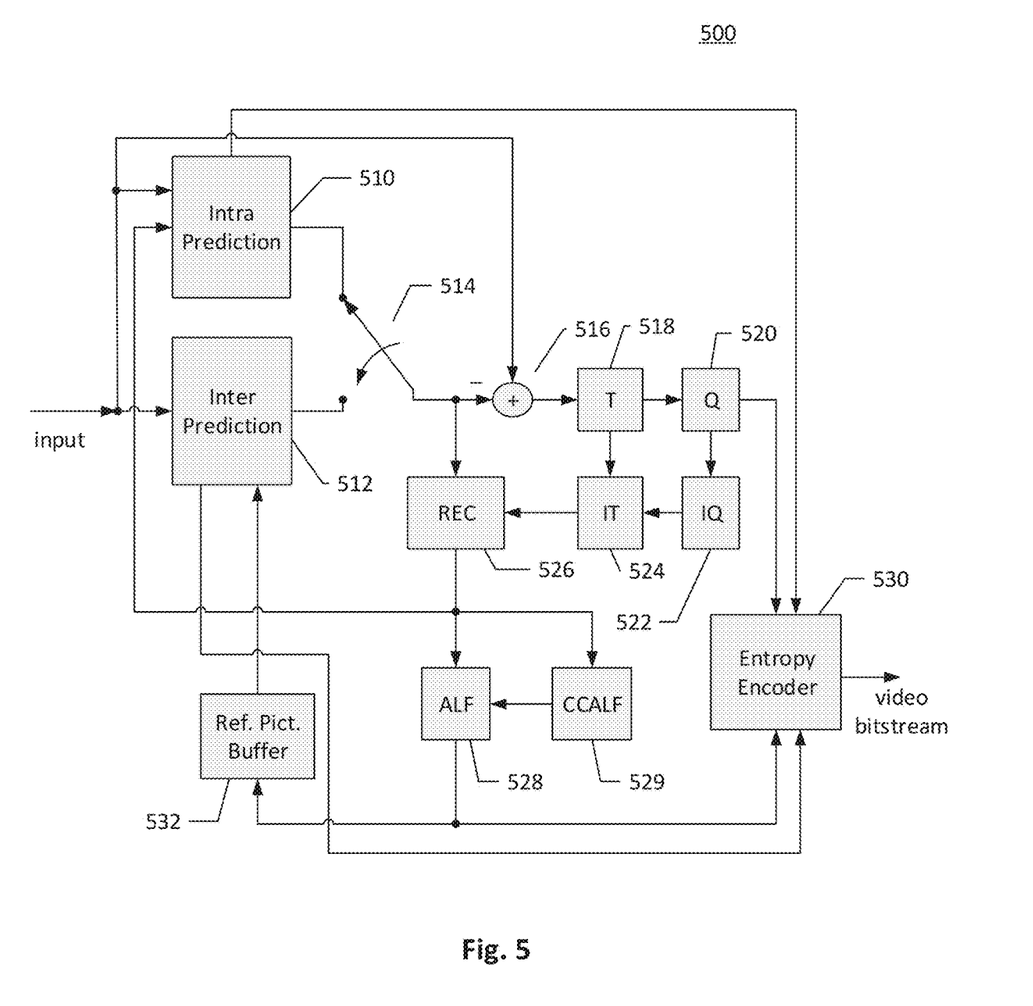
FIG. 5 illustrates an exemplary system block diagram for a video encoding system incorporating a video data processing method according to embodiments of the present invention.

Representative System Block Diagrams FIG. 5 illustrates an exemplary system block diagram for a Video Encoder 500 implementing embodiments associated with CCALF signaling. An Intra Prediction module 510 provides intra predictors based on reconstructed video data of a current picture. An Inter Prediction module 512 performs Motion Estimation (ME) and Motion Compensation (MC) to provide predictors based on referencing video data from other picture or pictures. A switch 514 selects a predictor from either the Intra Prediction module 510 or Inter Prediction module 512 and supplies the selected predictor to an Adder 516 to form residues. The residues of the current block are further processed by a Transformation module (T) 518 followed by a Quantization module (Q) 520. The Quantization module 520 receives scaled transform coefficients of each transform block from the Transformation module 518, and applies a quantization processing to generate a transformed and quantized residual signal. The transformed and quantized residual signal is then encoded by an Entropy Encoder 530 to form a video bitstream. The video bitstream is then packed with side information. The transformed and quantized residual signal of the current block is processed by an Inverse Quantization module (IQ) 522 and an Inverse Transformation module (IT) 524 to recover the prediction residues. As shown in FIG. 5, the residues are recovered by adding back to the selected predictor at a Reconstruction module (REC) 526 to produce reconstructed video data. The reconstructed video data may be stored in a Reference Picture Buffer (Ref. Pict. Buffer) 532 and used for prediction of other pictures. The reconstructed video data from the REC module 526 may be subject to various impairments due to the encoding processing, consequently, an Adaptive Loop Filter (ALF) 528 and a Cross Component adaptive Loop Filter (CCALF) 529 are applied to the reconstructed video data before storing in the Reference Picture Buffer 532 to further enhance picture quality. The CCALF 529 refines one or more chroma components according to the corresponding luma component. ALF coefficients and CCALF coefficients for a current slice or a current picture are signaled in one or more ALF APSs. For each ALF APS, values of two ALF signal flags and two CCALF signal flags are not all equal to 0 in order to ensure none of the ALF APSs is an empty APS.

In some embodiments, CCALF constraints or signaling methods are aligned with the ALF constraints or signaling methods. It is more efficient to align the CCALF constraints and ALF constraints as CCALF syntax elements are also signaled in ALF APSs. In one embodiment, different slices within the current picture can refer up to eight different APSs for retrieving CCALF coefficients as these slices can also refer up to eight different APSs for ALF coefficients. In one embodiment, CCALF signaling is possible either on PH or on SH which is aligned with ALF signaling. In another embodiment, a sequence level CCALF enable flag is conditionally signaled depending on a sequence level ALF enable flag. For example, a sequence level CCALF enable flag is signaled in a SPS only when a sequence level ALF enable flag indicates ALF is enabled. In yet another embodiment, a separate constraint flag for CCALF is added in the general constraint information syntax table. Syntax elements are provided to Entropy Encoder 530 for incorporation into the video bitstream.

Figure 6:
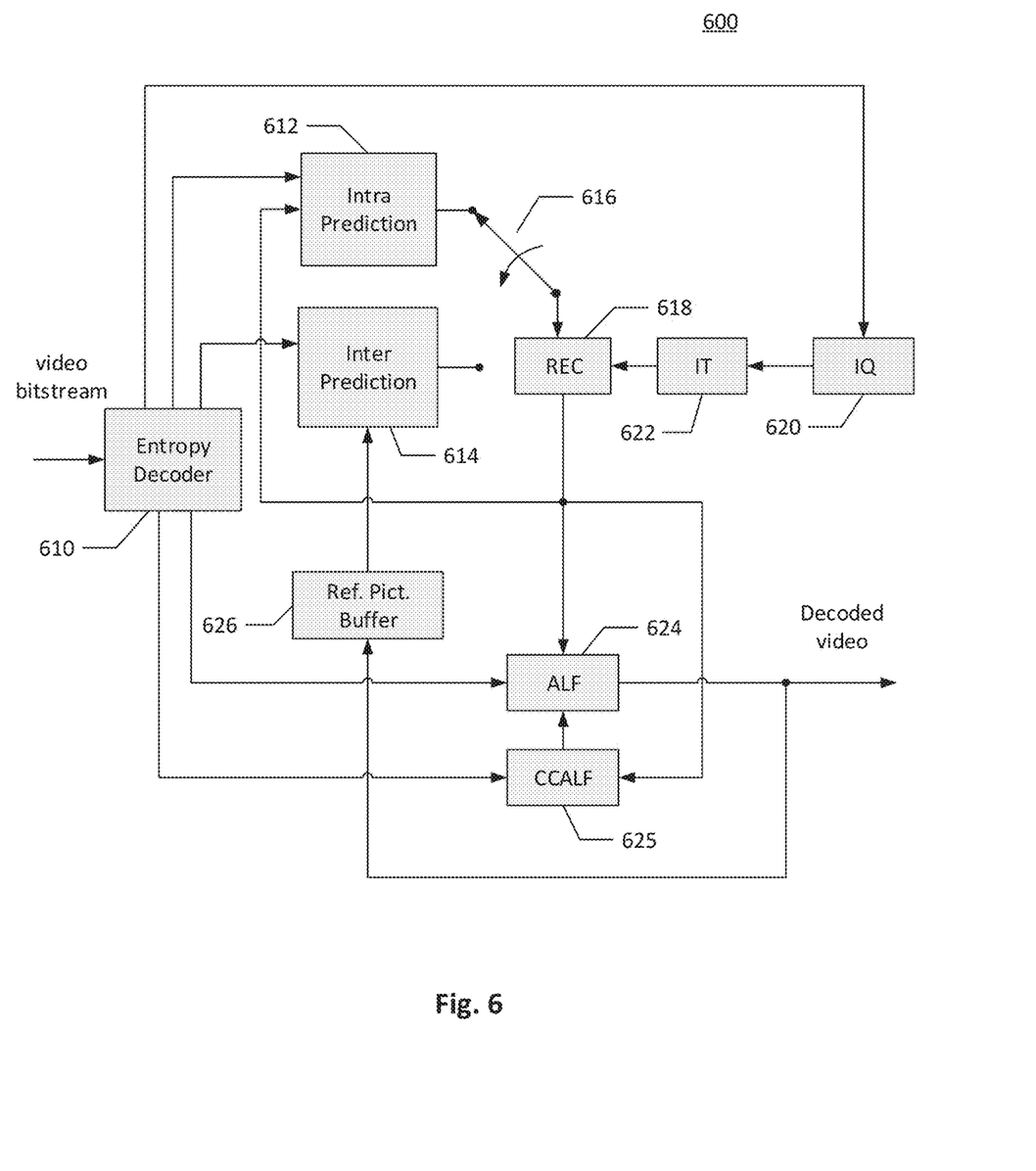
FIG. 6 illustrates an exemplary system block diagram for a video decoding system incorporating a video data processing method according to embodiments of the present invention.

A corresponding Video Decoder 600 for decoding the video bitstream generated by a video encoder such as the Video Encoder 500 of FIG. 5 is shown in FIG. 6. The video bitstream is the input to the Video Decoder 600 and is decoded by an Entropy Decoder 610 to parse and recover the transformed and quantized residual signal and other system information. The Entropy Decoder 610 parses coded transform coefficient levels of a current transform block. The decoding process of the Decoder 600 is similar to the reconstruction loop at the Encoder 500, except for the Decoder 600 only requires motion compensation prediction in an Inter Prediction module 614. Each block is decoded by either an Intra Prediction module 612 or Inter Prediction module 614. A Switch 616 selects an intra predictor from the Intra Prediction module 612 or Inter predictor from the Inter Prediction module 614 according to decoded mode information. The transformed and quantized residual signal is recovered by an Inverse Quantization module (IQ) 620 and an Inverse Transformation module (IT) 622. The recovered residual signal is reconstructed by adding back the predictor in a Reconstruction module 618 to produce reconstructed video. The reconstructed video is further processed by an Adaptive Loop Filter (ALF) 624 and a Cross-Component Adaptive Loop Filter (CCALF) 625 to generate final decoded video. The CCALF refines one or more chroma components according to the corresponding luma component. To process a current picture with the CCALF processing, CCALF coefficients are obtained from one or more ALF APSs referenced by slices in the current picture. In some embodiments of the present invention, values of two ALF signal flags alf_luma_filter_signal_flag and alf_chroma_filter_signal_flag and two CCALF signal flags alf_cross_component_cb_filter_signal_flag and alf_cross_component_cr_filter_signal_flag in each ALF APS are not all equal to 0. In other words, at least one set of luma ALF coefficients, chroma ALF coefficients, cross-component filter coefficients for the cb component, and cross-component filter coefficients for the cr component is signaled in each ALF APS. If the currently decoded picture is a reference picture, the reconstructed video of the currently decoded picture is also stored in a Ref. Pict. Buffer 626 for subsequent pictures in decoding order.

Various components of Video Encoder 500 and Video Decoder 600 in FIG. 5 and FIG. 6 may be implemented by hardware components, one or more processors configured to execute program instructions stored in a memory, or a combination of hardware and processor. For example, a processor executes program instructions to control applying a CCALF processing based on CCALF coefficients signaled in one or more ALF APSs. The processor is equipped with a single or multiple processing cores. In some examples, the processor executes program instructions to perform functions in some components in Encoder 500 and Decoder 600, and the memory electrically coupled with the processor is used to store the program instructions, information corresponding to the reconstructed images of blocks, and/or intermediate data during the encoding or decoding process. The memory in some embodiment includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable medium listed above. As shown in FIGS. 5 and 6, Encoder 500 and Decoder 600 may be implemented in the same electronic device, so various functional components of Encoder 500 and Decoder 600 may be shared or reused if implemented in the same electronic device. For example, one or more of Reconstruction 526, Inverse Transformation 524, Inverse Quantization 522, ALF 528, CCALF 529, and Reference Picture Buffer 532 in FIG. 5 may also be used to function as Reconstruction 618, Inverse Transformation 622, Inverse Quantization 620, ALF 624, CCALF 625, and Reference Picture Buffer 626 in FIG. 6, respectively.

Embodiments of the video data processing method performing a specific process on a current slice in a video coding system may be implemented in a circuit integrated into a video compression chip or program code integrated into video compression software to perform the processing described above. For examples, applying a CCALF processing may be realized in program code to be executed on a computer processor, a Digital Signal Processor (DSP), a microprocessor, or field programmable gate array (FPGA). These processors can be configured to perform particular tasks according to the invention, by executing machine-readable software code or firmware code that defines the particular methods embodied by the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

What is claimed is:

1. A video processing method in a video coding system, comprising:
   receiving input video data of a current block in a current picture;
   applying a Cross-Component Adaptive Loop Filter (CCALF) processing on the current block based on cross-component filter coefficients to refine one or more chroma components of the current block according to luma sample values of the current block;
   signaling two Adaptive Loop Filter (ALF) signal flags and two CCALF signal flags in an Adaptation Parameter Set (APS) with an APS parameter type equal to ALF or parsing two ALF signal flags and two CCALF signal flags from an APS with an APS parameter type equal to ALF;
   signaling or parsing one or more Picture Header (PH) CCALF syntax elements or Slice Header (SH) CCALF syntax elements, wherein both ALF and CCALF signaling are present either in a PH or SH,
   wherein CCALF signaling is conditioned on one of: a picture level ALF enabling flag, a slice level ALF enabling flag, or both a Sequence Parameter Set (SPS) level ALF enabling flag and a picture level ALF enabling flag; and
   encoding or decoding the current block in the current picture.

2. The method of claim 1, wherein different slices within the current picture are capable of referencing different ALF APSs for obtaining CCALF coefficients.

3. The method of claim 1, wherein different slices within the current picture are capable of referencing up to 8 ALF APSs for obtaining CCALF coefficients.

4. The method of claim 1, wherein a separate general constraint flag for the CCALF processing is signaled in or parsed from a general constraint information syntax table, wherein the SPS CCALF enabling flag is equal to 0 when the separate general constraint flag for the CCALF processing is equal to 1.

5. The method of claim 4, wherein the separate general constraint flag for the CCALF processing is equal to 1 if a general constraint flag for the ALF processing is equal to 1.

6. An apparatus of processing video data in a video coding system, the apparatus comprising one or more electronic circuits configured for:
   receiving input video data of a current block in a current picture;
   applying a Cross-Component Adaptive Loop Filter (CCALF) processing on the current block based on cross-component filter coefficients to refine one or more chroma components of the current block according to luma sample values of the current block;
   signaling two Adaptive Loop Filter (ALF) signal flags and two CCALF signal flags in an Adaptation Parameter Set (APS) with an APS parameter type equal to ALF or parsing two ALF signal flags and two CCALF signal flags from an APS with an APS parameter type equal to ALF;
   signaling or parsing one or more Picture Header (PH) CCALF syntax elements or Slice Header (SH) CCALF syntax elements, wherein both ALF and CCALF signaling are present either in a PH or SH,
   wherein CCALF signaling is conditioned on one of: a picture level ALF enabling flag, a slice level ALF enabling flag, or both a Sequence Parameter Set (SPS) level ALF enabling flag and a picture level ALF enabling flag; and
   encoding or decoding the current block in the current picture.

* * * * *